Feb. 20, 1951 P. TORRANI 2,542,374
MOTIVATING MEANS FOR AGRICULTURAL MACHINES
Filed Aug. 7, 1947
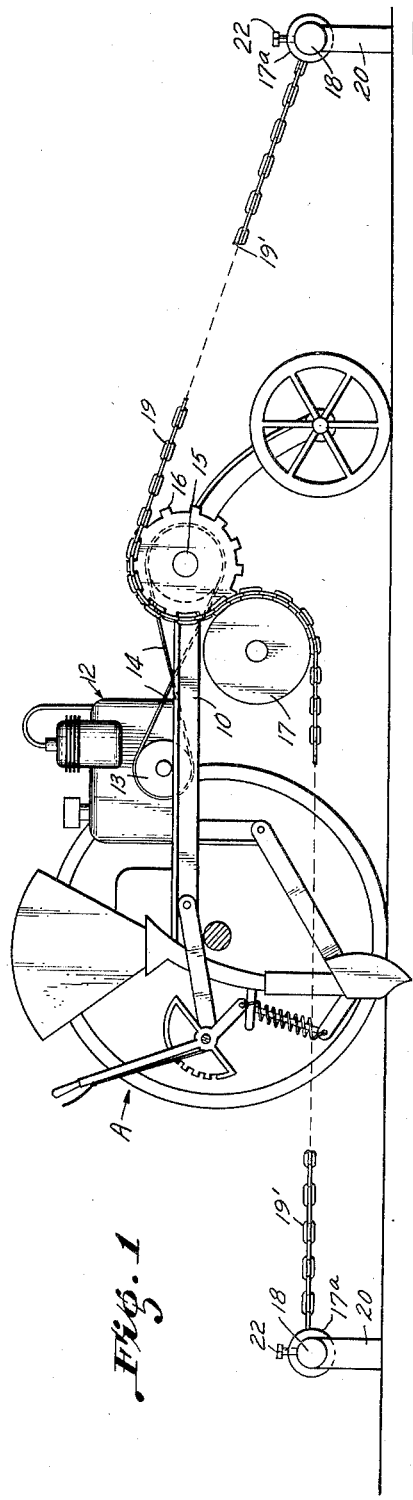
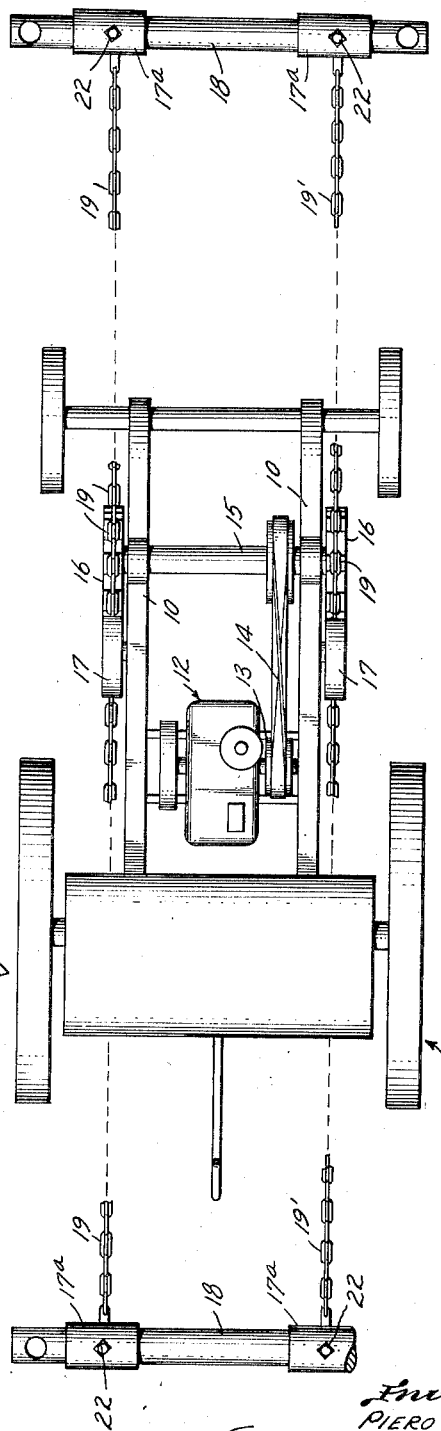
Inventor:
PIERO TORRANI
BY Arnold O'Brien
Attorney Patented Feb. 20, 1951

2,542,374

UNITED STATES PATENT OFFICE 2,542,374

MOTIVATING MEANS FOR AGRICULTURAL MACHINES

Piero Torrani, Golasecca, Italy

Application August 7, 1947, Serial No. 767,159
In Italy August 14, 1946

2 Claims. (Cl. 104—169)

The present invention relates to motivating means for agricultural machines.

Hitherto, the traction of agricultural machines has been caused by tractors or by winches or capstans. In the former case a loss of efficiency occurs in the auto-motivating of the tractor and a possible loss of power due to the wheels slipping on the ground, whilst the latter case involves considerable expense and, where the power is supplied by a manually operated capstan, requires a considerable amount of labour so that it is suitable only for large and heavy work.

The object of the present invention is the provision of a power drive for the motivating of agricultural machines such as ploughs, rakes, harrows, and the like implements, which will be positive in operation and of low cost, thereby overcoming the disadvantages previously associated with this kind of mechanism.

According to the present invention, the motivating means comprises at least one flexible element the ends of which are adapted to be securely fixed to the ground, and a power driven rotary prime mover on the agricultural machine to progressively engage said flexible element.

In order that the present invention may be readily understood, references will be made in the following description to the accompanying drawing, the construction hereinafter described and illustrated in the drawing referring to a preferred embodiment only and without limiting the invention thereto.

Referring to the drawings:

Figure 1 shows a cross section of a field which is in the stage of being worked by means of a farming implement or machine provided with means in accordance with the present invention.

Figure 2 shows in plan view the machine and the traction arrangement of Figure 1;

Referring particularly to Figures 1 and 2 the implement or machine A carries on its beam 10 a small motor 12 which operates a wheel or pulley 13 provided with belt 14 driving a shaft 15 carrying on each end a sprocket 16 adapted to engage, in combination with a sustaining corresponding roller 17, a chain 19, one on each side of the machine. The said two chains 19 and 19' are located along the field to be worked, and are composed of links, those of one chain accurately corresponding to the respective links of the other to insure even traction.

The chains 19 and 19' are fixed at their respective ends to sleeves 17a, or the like, slidable on tubular supports 18 and provided with locking screws 22, the said supports 18 being placed in transverse direction in respect of the chains 19, 19' and being secured to the ground by means of stakes or spikes 20.

It will be clearly seen that the operation of the invention is as follows: By actuating the motor 12 the chains 19, 19', through the pair of pulleys or wheels 16, 17 are pulled thru the machine A, the chains 19, 19' being fixed to the stationary support 18, the machine is displaced forwardly thus working the soil, whilst the chains 19, 19' are tensioned in the forward portion and are relieved or slacked off in the after portion of their length in regard to the position of the machine and its direction of travel.

While sometimes, depending on the work, only one chain is used in my traction arrangement, the requirements of the work as regards accuracy and loading, generally call for two chains as illustrated. In such cases it is desirable to use calibrated chains in order to obtain a truly rectilinear path of the machine by allowing the traverse of equal numbers of links in each run of the chains.

Having now particularly described and ascertained the nature of my said invention and in what manner the same is to be performed, I declare that what I claim is:

1. Motivating means for agricultural machines comprising in combination a pair of similar chains composed of accurately corresponding links and arranged in parallel relationship over the ground to determine the path of travel of the machine, means provided at each of the ends of said chains to secure the ends of said chains on the ground, a motor carried on the machine, and a similar sprocket wheel mounted on said machine for each of said chains, both sprocket wheels driven by said motor, an idler wheel for each of said sprocket wheels, each idler wheel mounted on an axis parallel to that of the sprocket wheel in position to hold each chain in driving engagement with its respective sprocket wheel, to cause the machine to be driven and directed along the path determined by said chains.

2. Motivating means for agricultural machines comprising in combination a pair of similar chains composed of accurately corresponding links adapted to be arranged in parallel relationship over the ground for determining the path of travel of the machine, means provided at each of the ends of said chains for securing the ends of said chains on the ground, a motor carried on the machine, and a similar sprocket wheel mounted on said machine for each of said chains, both sprocket wheels, driven by said motor, engaging said chains at an angle of less than 360° respectively, an idler wheel for each of said sprocket wheels, each idler wheel mounted on an axis parallel to that of the sprocket wheel in position to hold each chain in driving engagement with its respective sprocket wheel, to cause the machine to be driven and directed along the path predetermined by said chains.

TORRANI, PIERO.

REFERENCES CITED

The following references are of record in the file of this patent:

UNITED STATES PATENTS

| Number | Name | Date |
|---|---|---|
| 413,158 | Askew | Oct. 22, 1889 |
| 541,102 | Lomax | June 18, 1895 |
| 910,217 | McCandless | Jan. 19, 1909 |
| 938,655 | Eastman | Nov. 2, 1909 |
| 1,164,910 | Ayer | Dec. 21, 1915 |
| 1,245,208 | Edquist | Nov. 6, 1917 |
| 1,298,870 | Blanchard | Apr. 1, 1919 |
| 1,388,847 | Brunnert | Aug. 30, 1921 |